Aug. 18, 1959　　　　E. A. ROCKWELL　　　　2,900,054
MULTIPLE RATIO BRAKE PEDAL CONSTRUCTION
Filed Oct. 25, 1954　　　　　　　　　　　　　　2 Sheets-Sheet 1

INVENTOR
*Edward A. Rockwell*
BY
*Arthur Wright*
ATTORNEY

Aug. 18, 1959  E. A. ROCKWELL  2,900,054
MULTIPLE RATIO BRAKE PEDAL CONSTRUCTION
Filed Oct. 25, 1954  2 Sheets-Sheet 2

INVENTOR
*Edward A. Rockwell*
BY
*Arthur Wright*
ATTORNEY

United States Patent Office 2,900,054
Patented Aug. 18, 1959

2,900,054

MULTIPLE RATIO BRAKE PEDAL CONSTRUCTION

Edward A. Rockwell, Los Angeles, Calif.

Application October 25, 1954, Serial No. 464,468

8 Claims. (Cl. 188—152)

My invention relates particularly to an apparatus for attaining increased leverage, as well as a longer stroke, in the operation of brake pedals or treadles.

An object of my invention is to attain greater effectiveness, by means of increased leverage and/or length of stroke when needed, in the operation of brake pedals for power-driven vehicles, such as automobiles, etc. A further object is to provide increased leverage, as well as a longer available stroke, in the operation of master cylinders used in the control of accessories on the vehicles. Still another object is to provide increased effectiveness in the operation of power units for the operation of brakes thereby.

Hitherto, it has been found in operating the brakes or other vehicle accessories by power, such as a vacuum, that under normal operation the application of power can be readily and effectively applied even with a short range pedal so long as the power continues to be available, but that in case of diminution of the supply of power the manual effort transmitted for the operation of the accessory is inadequate for the effective operation thereof. This is especially important in the case of brakes. Accordingly, it is the purpose of my invention to provide a linkage whereby sufficient leverage and an adequate length of travel of the pedal are available, in order to supply ample manual pressure, in the case of the interruption or failure of the power. A further object is to avoid any detrimental effect on the manual control of the accessory by reason of the sudden restoration of the power after the interruption thereof.

Further objects of my invention will appear from the detailed description of the same hereinafter.

While my invention is capable of embodiment in many different forms, by way of illustration I have shown only one form thereof, in which—

Figure 1:
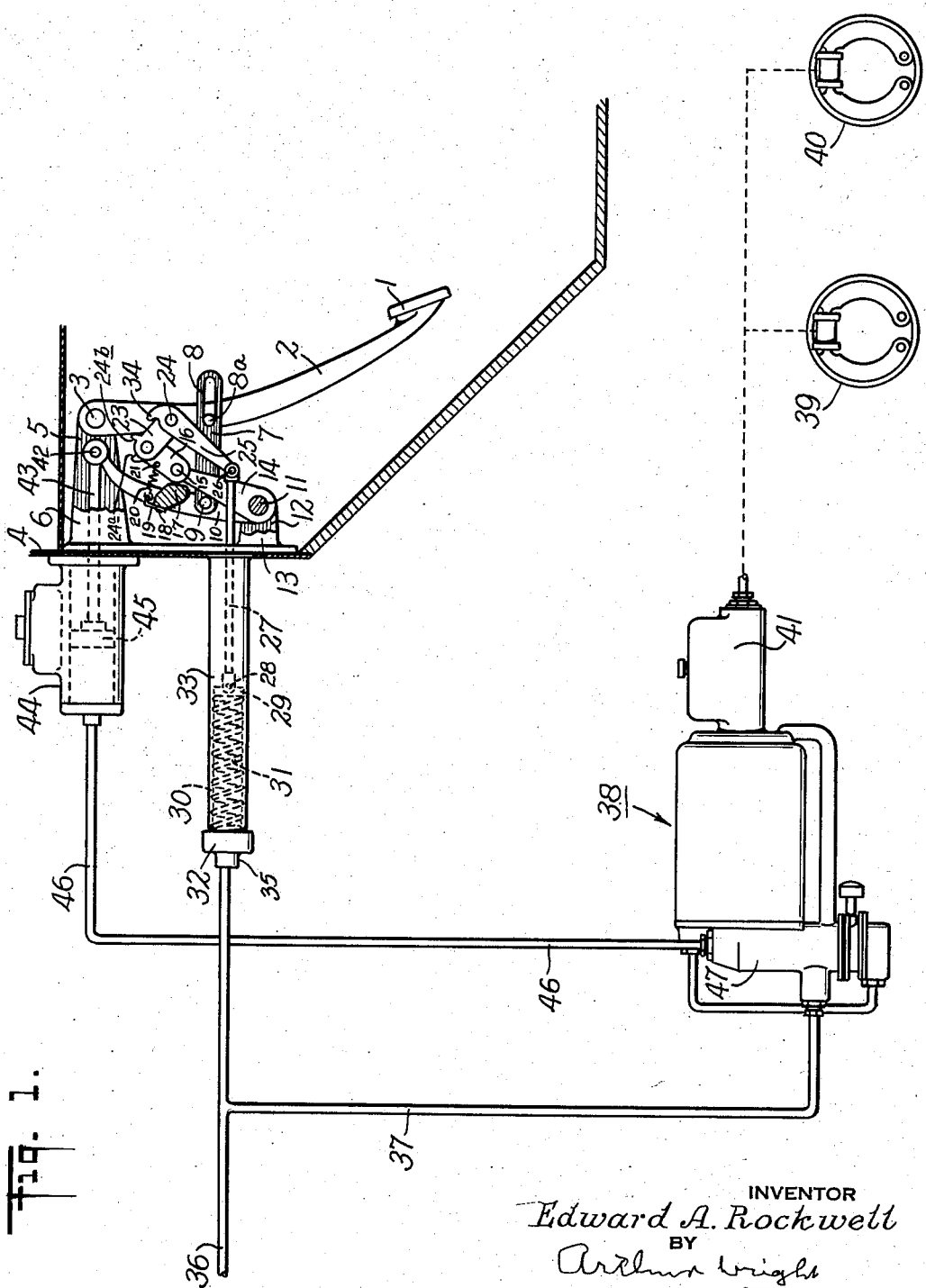
Figure 2:
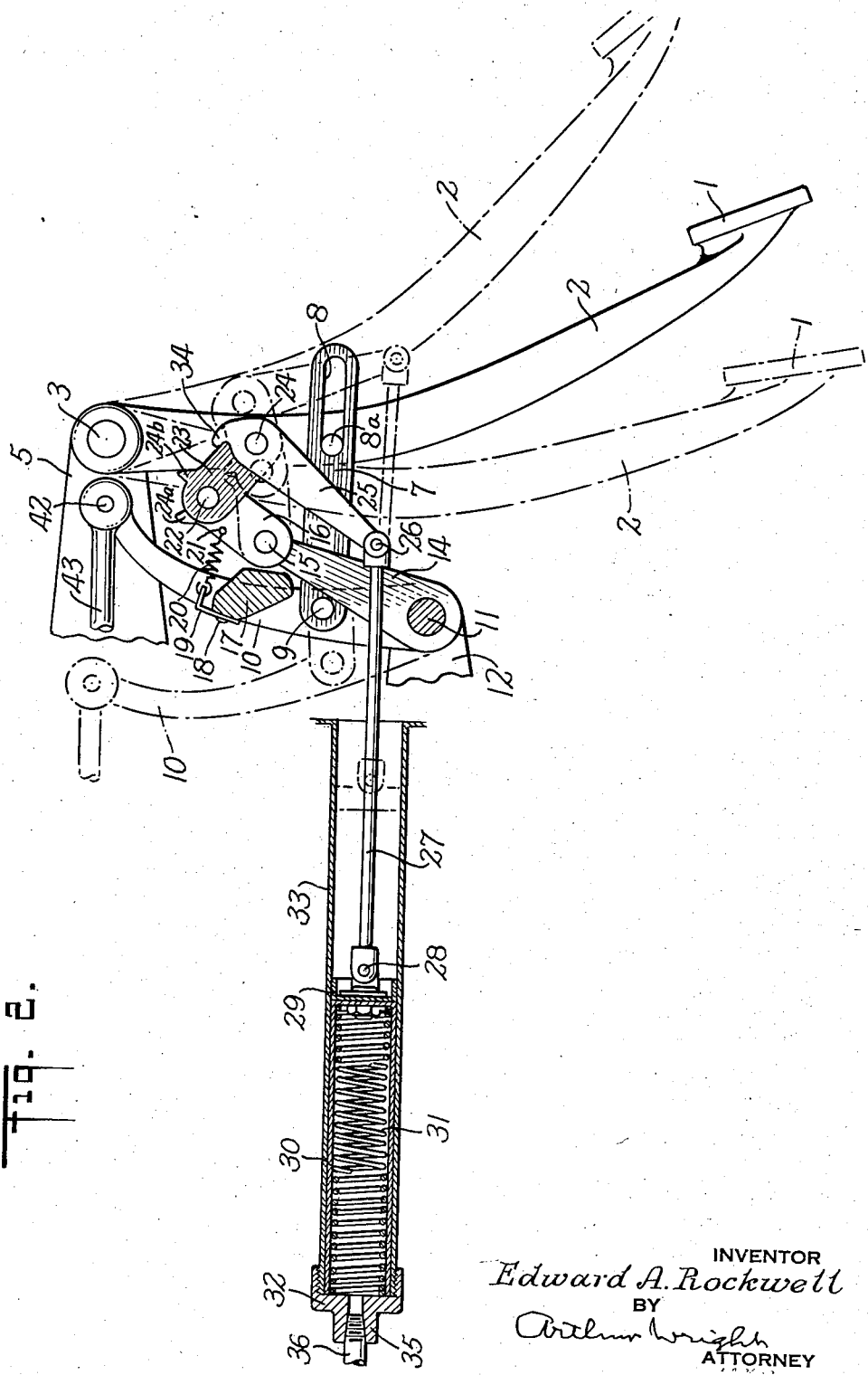

Fig. 1 is a side elevation of a linkage made in accordance with my invention; and Fig. 2 is a diagrammatic side elevation of the same shown in relation to any desired type of accessory-operating power unit.

Referring to the drawing, I may provide on an automobile of any desired type a brake operating mechanism including a pedal 1 carried by a brake pedal lever 2 on a shaft 3 which is supported on a fixed support afforded by the fire wall 4 of the automobile, between upper brackets 5 and 6 formed thereon at the right and left-hand sides of the pedal linkage. The pedal lever 2 is connected by a lost-motion slide link 7 having a slot 8 therein, and a pin 8a located on the lever 2, to a pivot 9 on a coupling lever 10 connected to a brake operating member, such as a master cylinder. The coupling lever is pivotally carried upon a shaft 11 supported between two lower brackets 12 and 13 formed on the fire wall 4 at the right and left-hand sides of the pedal linkage, respectively. The said shaft 11, furthermore, serves as a pivot for an auxiliary lever 14, freely rotatable thereon. At its upper end the auxiliary lever 14 has a pivot 15 for receiving a toggle lever 16, the lower end of which can be brought into contact with an abutment 17 formed on the master cylinder operating lever 10. Also, the said lever 10 has fastened thereto, by a screw 18, an apertured arm 19 connected to a coil retracting spring 20, the other end of which is connected to a pin 21 on the toggle lever 16. The said toggle lever 16, furthermore, has at its upper end a pivotal connection 22 to a second toggle lever 23, the rear end of which has a pivot 24 on the pedal lever 2. The toggle levers 16 and 23 are also provided, respectively, with cooperating offset stops 24a and 24b. Furthermore, the said pivot 24 carries loosely thereon an arm 25 connected by a pivot 26 to a link 27 having a pivotal connection 28 to a plunger 29 provided with a cylindrical shell 30 forming a housing for a retracting coil spring 31, abutting at its forward end against a cap 32 screw-threaded to a cylinder 33 surrounding the shell 30 which is mounted in any desired manner upon the forward face of the fire wall 4. Also, it will be noted that the upper end of the arm 25 has an ear 34 overlying the upper side of the second toggle lever 23, as hereinafter referred to.

The cap 32 is provided with a screw-threaded end 35 for receiving the end of a pipe 36, for connection to any desired source of vacuum, but preferably the engine manifold of the automobile, which may also provide a source of vacuum by means of a pipe 37 for operating any desired power unit 38 provided for the operation of any desired accessories on the automobile, as for instance wheel brakes 39 and 40 by means of a power-operated master cylinder 41, as shown in detail in my Patent No. 2,593,394, upon Power Pressure Intensifier, granted April 15, 1952. Any desired type of power unit may be utilized, instead however, in connection with my linkage, as for instance disclosed in my Patent No. 2,603,066, upon Tandem Power Unit for Applying Hydraulic Pressure, granted July 15, 1952, or as shown in my Patent No. 2,593,192, upon Accessory Hydraulic Adjuster, granted April 15, 1952, especially in Figs. 1 to 4 thereof.

The said power unit 38 is operated and controlled by means of the coupling lever 10 which, at its upper end, is provided with a pivotal connection 42 to a master cylinder operating rod 43, which operates a master cylinder 44 of any desired type, mounted on the fire wall 4 or elsewhere, and having a master cylinder piston 45. The liquid from the master cylinder 44 is conveyed under the manual pressure applied through a pipe 46, which connects the same to a valve-operating mechanism 47 on the power unit 38.

In the operation of my invention, it will be understood that the control of the power unit 38 for applying hydraulic liquid under pressure, for instance to the brakes 39 and 40, is supplied from the master cylinder 44 by the operation of the pedal 1. In the normal operation thereof, the vacuum in the cylinder 33 will retain the piston 29 towards the left-hand end of the cylinder 33 by compressing the spring 31 into the position as shown in Fig. 1. Accordingly, in this position the pin 8a on the pedal lever 2 will seat against the left-hand end of the slot 8 in the lost-motion link 7 so as to bear upon the pivot 9 on the coupling lever 10, thus providing a short range travel for the pedal 1 and a linkage ratio of about 1:1, when applied to the rod 43, retracted by the master cylinder piston. Under unusual conditions of operation of the automobile, however, when the vacuum available becomes insufficient to satisfactorily operate the power unit 38, as for instance when the vacuum is interrupted in the pipe 36, the changeable ratio motion transmitting coupling of this invention becomes effective to increase the ratio between the brake pedal lever 2 and the coupling lever 10. In carrying out the invention the spring 31 will be released upon failure of the vacuum or power, thus moving the arm 25 by the spring 31 forcing the transverse ear 34 downwardly on top of the toggle lever 23 against the retracting spring 20 so that the toggle lever 16 is moved downwardly forcibly against the abutment 17 on the master cylinder lever 10. On account of the slot 8 which thereby becomes displaced from the pivot pin 8a, the pedal lever 2 will now exert its force, instead, through the toggle levers 23 and 16 and the abutment 17 against the coupling lever 10, thus providing a greatly increased leverage, in favor of the manual operation from the pedal 1 in the movement of the master cylinder piston 45. This is accomplished, also, by a greatly increased length of the path of movement of the pedal 1, which is insured by the adequate overall force of the spring 31, as indicated in the drawings, because of the rod 27 having been forced to the right, in Fig. 1, until the toggle levers 16 and 23 are completely extended into their straight alignment into a stop position. Accordingly, this provides a very much increased facility of operation for the master cylinder 41, when it becomes necessary to operate the brake or other accessory entirely by the manual force applied, or when the power has become wholly or partially inadequate by reason of the decrease or failure thereof. When the power is again restored sufficiently to compress the spring 31, thereby moving the plunger 29 to the left, in Fig. 1, the ear 34 will initially ride away from the upper face of the toggle lever 23 if the pressure from the foot is still being applied to the pedal 1, thereby preventing any sudden release of reaction present in the pedal linkage. When, thereafter, the manual pressure on the pedal 1 is released, however, the retracting spring 20 will draw the toggle levers 16 and 23 upwardly so as to restore the contact of the ear 34 therewith, and so as to reinstate the 1:1 ratio operating against the pivot 9. It will be noted that by having the servo unit 38 operated by the master cylinder and located in the engine compartment, instead of in the driver's compartment the previous disadvantage of any movable tubular connection to the pedal lever is obviated.

The arrangement illustrated in the drawings provides alternative mechanical linkages for actuating the master cylinder 44 by means of the lever 10. These alternative mechanical linkages comprise (1) a low ratio (1:1) short travel linkage employed when the power is "on," and consisting of the lost motion link 8. This link 8 is actuated directly from the pedal 2 by means of the pin 8a. (2) The other mechanical linkage is a high ratio linkage for providing increased power to operate the brake or other accessory entirely by the manual force obtained from the actuation of the foot pedal 2. Such might be required in the event of failure of vacuum power. This high ratio linkage is through the straightened toggle levers 23 and 16, and an abutment 17 carried by the lever 10.

Under this arrangement when the power is "on" as shown in Fig. 2, the toggle levers 23 and 16 are bent and the transmission of force from the pedal 2 is through the low ratio linkage. When the power is "off" the spring 31 behind the plunger rod 27 is effective to straighten the linkage through the agency of the actuating link 25 and the projection 34 on the end of that link which bears down on the edge of the toggle link 23 to straighten it with relation to the other toggle link 16. The linkage in this condition is shown in Fig. 2a.

While I have described my invention above in detail I wish it to be understood that many changes may be made therein without departing from the spirit of the same.

I claim:

1. A brake operating mechanism comprising a brake operating member, a brake pedal lever pivotally mounted upon a fixed support, and a changeable ratio motion transmitting coupling between said brake pedal lever and said brake operating member, said coupling including a coupling lever pivotally mounted on said support adjacent said brake pedal lever, means connecting said coupling lever and said brake operating member, means interconnecting said levers including a toggle linkage, said toggle linkage comprising a pair of toggle links pivotally connected to each other, said pair of toggle links when straightened providing a rigid connection to move said coupling lever at one ratio when the brake pedal lever is operated, spring means, means including a lost motion connection means between said spring means and said toggle links so arranged that said spring means after taking up the lost motion of the latter connection means tends to move said toggle links in one direction to straighten the latter, pressure responsive means opposing said spring means and tending to stress the latter, said toggle linkage including means to collapse the same when said spring means is so stressed, and means connecting said levers when said toggle linkage is collapsed at a different ratio, said lost motion connection means providing for movement of said brake pedal lever, and said coupling lever, independently of both said spring means and said pressure responsive means.

2. A brake operating mechanism comprising a brake operating member, a brake pedal lever pivotally mounted upon a fixed support, and a changeable ratio motion transmitting coupling between said brake pedal lever and said brake operating member, said coupling including a coupling lever pivotally mounted on said support adjacent said brake pedal lever, means connecting said coupling lever and said brake operating member, means interconnecting said levers including a toggle linkage, said toggle linkage comprising a pair of toggle links pivotally connected to each other and to said brake pedal lever, and means carried by said coupling lever for cooperation with said pair of toggle links when straightened to provide a rigid connection through said last-named means to move said coupling lever at one ratio when the brake pedal lever is operated, spring means, means including a lost motion connection means between said spring means and said toggle links so arranged that said spring means after taking up the lost motion of the latter connection means tends to move said toggle links in one direction to straighten the latter, pressure responsive means opposing said spring means and tending to stress the latter, said toggle linkage including means to collapse the same when said spring means is so stressed, and means connecting said levers when said toggle linkage is collapsed at a different ratio, said lost motion connection means providing for movement of said brake pedal lever, and said coupling lever, independently of both said spring means and said pressure responsive means.

3. A brake operating mechanism comprising a brake operating member, a brake pedal lever pivotally mounted upon a fixed support, and a changeable ratio motion transmitting coupling between said brake pedal lever and said brake operating member, said coupling including a coupling lever pivotally mounted on said support adjacent said brake pedal lever, means connecting said coupling lever and said brake operating member, means interconnecting said levers including a toggle linkage, said toggle linkage comprising a pair of toggle links pivotally connected to each other and to said brake pedal lever, and an abutment on said coupling lever, said pair of toggle links when straightened engaging said abutment and providing a rigid connection to move said coupling lever at one ratio when the brake pedal lever is operated, spring means, means including a lost motion connection means between said spring means and said toggle links so arranged that said spring means after taking up the lost motion of the latter connection means tends to move said toggle links in one direction to straighten the latter, pressure responsive means opposing said spring means and tending to stress the latter, said toggle linkage including means to collapse the same when said spring means is so stressed, and means connecting said levers when said toggle linkage is collapsed at a different ratio, said lost motion connection means providing for movement of said brake pedal lever, and said coupling lever, independently of both said spring means and said pressure responsive means.

4. A brake operating mechanism comprising a brake operating member, a brake pedal lever pivotally mounted upon a fixed support, and a changeable ratio motion transmitting coupling between said brake pedal lever and said brake operating member, said coupling including a coupling lever pivotally mounted on said support adjacent said brake pedal lever, means connecting said coupling lever and said brake operating member, means interconnecting said levers including a toggle linkage, said toggle linkage comprising a pair of toggle links pivotally connected to each other, one of said toggle links having a pivotal connection to said brake pedal lever, the other of said toggle links having a connection to said coupling lever providing for movement toward the latter when said pair of toggle links is straightened providing a rigid connection to move said coupling lever at one ratio when the brake pedal lever is operated, spring means, means including a lost motion connection means between said spring means and said toggle links so arranged that said spring means after taking up the lost motion of the latter connection means tends to move said toggle links in one direction to straighten the latter, pressure responsive means opposing said spring means and tending to stress the latter, said toggle linkage including means to collapse the same when said spring means is so stressed, and link means providing a connection between said levers when said toggle linkage is collapsed at a different ratio, said lost motion connection means providing for movement of said brake pedal lever, and said coupling lever via said link means, independently of both said spring means and said pressure responsive means.

5. A brake operating mechanism comprising a brake operating member, a brake pedal lever pivotally mounted upon a fixed support, and a changeable ratio motion transmitting coupling between said brake pedal lever and said brake operating member, said coupling including a coupling lever pivotally mounted on said support adjacent said brake pedal lever, means connecting said coupling lever and said brake operating member, means interconnecting said levers including a toggle linkage, said toggle linkage comprising a pair of toggle links pivotally connected to each other, said pair of toggle links when straightened providing a rigid connection to move said coupling lever at one ratio when the brake pedal lever is operated, spring means, means including a lost motion connection means between said spring means and said toggle links so arranged that said spring means after taking up the lost motion of the latter connection means tends to move said toggle links in one direction to straighten the latter, pressure responsive means opposing said spring means and tending to stress the latter, said toggle linkage including means to collapse the same when said spring means is so stressed, and slotted link means providing a lost motion connection between said levers effective when said toggle linkage is collapsed to provide a connection between said levers at a different ratio, said lost motion connection means providing for movement of said brake pedal lever, and said coupling lever via said slotted link means, independently of both said spring means and said pressure responsive means.

6. A brake operating mechanism comprising a brake operating member, a brake pedal lever pivotally mounted upon a fixed support, and a changeable ratio motion transmitting coupling between said brake pedal lever and said brake operating member, said coupling including a coupling lever pivotally mounted on said support adjacent said brake pedal lever, means connecting said coupling lever and said brake operating member, means interconnecting said levers including a toggle linkage, said toggle linkage comprising a pair of toggle links pivotally connected to each other and to said brake pedal lever and means carried by said coupling lever for cooperation with said pair of toggle links when straightened to provide a rigid connection to move said coupling lever at one ratio when the brake pedal lever is operated, spring means, means including a lost motion connection means between said spring means and said toggle links so arranged that said spring means after taking up the lost motion of the latter connection means tends to move said toggle links in one direction to straighten the latter, pressure responsive means opposing said spring means and tending to stress the latter, said toggle linkage including means to collapse the same when said spring means is so stressed, and slotted link means providing a lost motion connection between said levers effective when said toggle linkage is collapsed to provide a connection between said levers at a different ratio, said lost motion connection means providing for movement of said brake pedal lever, and said coupling lever via said slotted link means, independently of both said spring means and said pressure responsive means.

7. A brake operating mechanism comprising, a brake operating member, a brake pedal lever pivotally mounted upon a fixed support, and a changeable ratio motion transmitting coupling between said brake pedal lever and said brake operating member, said coupling including a coupling lever pivotally mounted on said support adjacent to said brake pedal lever, link means having a lost motion connection with one of said levers and interconnecting said brake pedal lever and said coupling lever, means including a toggle linkage interconnecting said levers, said toggle linkage being effective when straightened to transmit force from said pedal lever to said coupling lever at a predetermined ratio, said link means being effective to transmit force from said pedal lever to said coupling lever at a different ratio when said toggle linkage is collapsed, said toggle linkage comprising a pair of toggle links pivotally connected to each other, one of said toggle links having an extension engageable with the other toggle link to define the straightened condition and limiting the over-center movement, spring means, a power device opposing said spring means mounted on said support and having a movable wall element therein, a lost motion connection between one of said toggle links and said element, said element being arranged so that movement in one direction by said spring means after taking up the lost motion of the latter connection is effective to straighten said toggle linkage, and means connecting said power device to a source of pressure different from the atmosphere and effective for moving the element in the opposite direction to stress said spring means, said toggle linkage having means acting thereon to bias the same in a direction to collapse the toggle linkage when said spring is so stressed.

8. A brake operating mechanism for a motor vehicle comprising a brake pedal lever pivotally suspended from a bracket on one side of the fire wall of the motor vehicle, a master cylinder carried on the other side of said fire wall, and a changeable ratio motion transmitting coupling between said brake pedal lever and said master cylinder, said coupling including a coupling lever pivotally mounted on one side of said fire wall adjacent said brake pedal lever and connected to operate said master cylinder, link means having a lost motion connection with one of said levers and interconnecting said levers, means including a toggle linkage interconnecting said levers, said toggle linkage when straightened being effective to transmit force from said pedal lever to said coupling lever at a predetermined ratio, said link means being effective to transmit force from said pedal lever to said coupling lever at a different ratio when said toggle linkage is collapsed, and a power unit mounted on said other side of said fire wall below said master cylinder, said power unit being controlled by the master cylinder and having a lost motion connection to said toggle linkage, spring means opposing said power unit and tending when the power is "off" after taking up the lost motion of the latter connection to straighten said toggle linkage, said toggle linkage having means acting thereon to bias the same in a direction to collapse the linkage when power is "on," said connections between said master cylinder and coupling lever, and said power unit and toggle linkage, respectively, extending through said fire wall and substantially parallel so as to act in substantially the same direction on the toggle linkage and levers.

References Cited in the file of this patent

UNITED STATES PATENTS

| | | |
|---|---|---|
| 2,037,869 | Wall | Apr. 21, 1936 |
| 2,077,456 | Begg | Apr. 20, 1937 |
| 2,365,960 | Ingres | Dec. 26, 1944 |
| 2,706,020 | Freers et al. | Apr. 12, 1955 |
| 2,809,725 | Ayers | Oct. 15, 1957 |